United States Patent Office 3,781,219
Patented Dec. 25, 1973

3,781,219
HALIDE ADDITION AND DISTRIBUTION IN THE REACTIVATION OF PLATINUM-RHENIUM CATALYSTS
Marvin F. L. Johnson, Homewood, and Stuart L. Graff, Calumet City, Ill., assignors to Atlantic Richfield Company, New York, N.Y.
No Drawing. Filed Mar. 20, 1970, Ser. No. 21,551
The portion of the term of the patent subsequent to Jan. 2, 1989, has been disclaimed
Int. Cl. B01j 11/18
U.S. Cl. 252—415          19 Claims

ABSTRACT OF THE DISCLOSURE

A process for reactivation, including chlorination, of a fixed bed of carbon-fouled, platinum group metal- and rhenium-containing, alumina-supported catalyst is disclosed which involves contacting the catalyst with an oxygen-containing gas, then with a gaseous stream containing inert gas, oxygen and vaporous chlorine-containing agent until at least about 0.2% chlorine has been added to the catalyst based on the total weight of catalyst in the bed. Contact of the catalyst is then continued with a gaseous stream containing inert gas, oxygen and a minor amount of water vapor to distribute chlorine in the catalyst bed.

This invention pertains to the reactivation of a fixed bed of used, relatively carbon-free, platinum group metal-rhenium-alumina catalyst, preferably whose alumina base is composed of activated or gamma-family alumina modifications resulting from the calcination of precursor hydrous alumina predominating in alumina trihydrate.

Catalysts composed essentially of small amounts of platinum group metal and rhenium supported on calcined or activated alumina can be employed to promote reactions conducted under reducing conditions, particularly in the presence of molecular hydrogen. The most apparent use of such catalysts is in the reforming of broad or narrow cuts of gasoline boiling range hydrocarbons derived from mineral oil sources to obtain fuels of higher octane rating than the feed, or aromatic hydrocarbons. Straight run or hydrogenated cracked petroleum naphthas and their various fractions are most often employed as the feedstocks in reforming operations. These catalysts can also be used to enhance other reactions in which hydrocarbons are converted under reducing conditions involving one or more of the reactions of isomerization, dehydrogenation, dehydrocyclization, hydrocracking and hydrogenation. The platinum group metal-rhenium-alumina catalyst usually contain a small amount of chloride which is often present in the catalyst due to the use of a chlorine-containing platinum compound, for instance, chloroplatinic acid, as the source of platinum in manufacturing the catalyst. The chloride can, however, be separately added to the catalyst. The promoting metals of these types of catalyst are in their most active state when undetectable by present X-ray diffraction techniques, thereby indicating the presence of the metals in combined form or, if as elemental metals, in such finely divided state that their crystallite sizes are less than about 50 A.

During use of these platinum group metal-rhenium-alumina catalysts they lose activity over a period of time, the length of which depends on such factors as the type of conversions being effected, reaction severity, extent of impurities in the feedstock and other conditions of use and regeneration. A portion of the hydrocarbon being converted forms a carbonaceous deposit on the catalyst in spite of the fact that the presence of molecular hydrogen in the reaction system reduces such deposition. Also, catalytic activity is lost during regeneration due to the growth of promoting metal crystallites and the loss of chloride. The chloride in the catalyst contributes to its acidity and therefore the loss of chloride results in a reduction in this type of catalytic activity. Such activity in a controlled amount is desirable in many operations, for instance, in naphtha reforming.

Due to various considerations the platinum group metal-rhenium-alumina catalysts can be advantageously employed as macrosize particles disposed as a fixed bed. A plurality of such reactors, each containing a fixed bed of the catalyst, can be employed in series in reforming or other endothermic reaction systems and a heater for the charge stock precedes each reactor. Also the reactors can be employed in parallel relationship or in a swing reactor operation. In these systems the catalyst eventually loses sufficient activity that it is no longer desirable to continue processing the hydrocarbon feed. The catalyst is then regenerated by the removal of most of the carbonaceous deposit and, if desired, reactivated by other treatments which may redisperse larger promoting metal crystallites or increase the chloride content of the catalyst. The regeneration and reactivation can be accomplished by taking all reactors off processing and performing the necessary regeneration and reactivation. In swing type reactor systems the regeneration and reactivation can be done on an individual reactor basis. In many operations, regeneration of the catalyst, that is, the removal of the major amount of the carbonaceous deposit, will be effected more often than the reactivating procedures involving redispersion of promoting metals or the addition of chloride. Although, if desired, the catalyst can be both regenerated and reactivated each time it is removed from processing the hydrocarbon feedstock.

By the present invention there has been devised a procedure whereby regenerated platnium group metal-rhenium-alumina catalysts, preferably those whose alumina is derived from hydrous alumina predominating in trihydrate, can be successfully reactivated through chloride addition and, if desired, promoting metal redispersion. In the operation the regenerated catalyst is contacted with a chlorine (Cl)-containing material and simultaneously, or subsequently, or both with oxygen and water vapor. A preferred embodiment of the process of this invention involves the deposition of chloride in a portion of the fixed catalyst bed through treatment with a gaseous stream containing small amounts of a chlorine-containing material, oxygen and often water vapor, and subsequently distributing the chloride through a major portion of the bed by continuing the gaseous treatment. The chloride distributing step is preferably conducted in the absence of further addition of the chlorine-containing material to the entering gas stream, but in the presence of oxygen and water vapor. The deposition of the chloride source on the portion of the catalyst bed can be conducted under conditions which avoid water contact or hold it at a low level. The subsequent treatment of the catalyst bed is preferably under conditions which provide for adequate chloride distribution without unduly deteriorating the surface area of the catalyst or producing excessive loss of chlorine from the reactor which can give rise to equipment corrosion problems. Of course, the loss of chloride from the catalyst is economically disadvantageous. Moreover, the total water contacting the catalyst during both chloride deposition and distribution is most advantageously restricted depending on the temperatures employed.

By the method of the present invention there is reactivated through chloride addition and, when desired promoting metal redispersion, a fixed bed of used but regenerated platinum group metal-rhenium-alumina catalyst, preferably whose alumina is derived from hydrous alumina predominating in trihydrate, by contact of the catalyst with a gaseous stream which is composed predominantly of inert gas such as nitrogen or flue gas and containing oxygen, a chlorine-containing material in the vapor state, and, if desired, water vapor. If water vapor be present in the gaseous stream it is generally such that the partial pressure of this component is up to about 0.8 pound per square inch absolute (p.s.i.a.). Often the water vapor content is at least about 100 p.p.m. (parts per million by volume). The mole ratio of water to chlorine (Cl) in the vapor stream may be zero and usually will not exceed about 10:1, often the water to chlorine ratio is at least about 0.5:1 or even at least about 1:1. The oxygen content of the chlorine-containing gaseous stream is usually such that the oxygen partial pressure is about 3 to 100 p.s.i.a., preferably about 5 to 50 p.s.i.a.

During treatment of the catalyst with the chlorine-containing gas the temperature of the gaseous stream can be in the range of about 600 to 950° F. If one desires to disperse the promoting metals during this operation as well as deposit the chloride, the gas temperature is advantageously maintained in the range of about 800 to 950° F., whereas if metal dispersion is not desired in this step of the operation the chloride addition can be accomplished at lower temperatures of the order of about 600 to 750° F. The total pressure of the system during this gas treatment is usually about 50 to 500 pounds per square inch gauge (p.s.i.g.), and is preferably about 175 to 350 p.s.i.g.

During initial contact of the regenerated catalyst with the chlorine-containing gaseous stream, deposition of the chloride component apparently occurs primarily in the initial portion of the catalyst bed. When the treatment begins the catalyst often has a surface area of about 150 to 250 square meters per gram and a chloride content of about 0.05 to 0.8 weight percent, and at least about 0.2 weight percent less than when in the virgin state, more often at least about 0.4 weight percent less. During the chloride deposition the amount of chloride added, which is a function of the amount of chlorine in the gaseous stream and the time of contact is such that at least about 0.2, preferably at least about 0.3, weight percent chlorine or chloride, is added based on the total catalyst inventory in the bed or beds treated.

The treatment with the chlorine-containing gas can be continued to distribute the chloride substantially throughout the catalyst bed if the gas contains water vapor. However, it is highly preferred that the gas employed during the distribution stage be upon entering the bed, essentially free of chlorine. After the chloride distribution throughout the catalyst bed the catalyst on an average basis can contain about 0.4 to 1 weight percent chloride, with the chloride added usually being at least about 0.2, preferably at least about 0.3, weight percent based on the catalyst. The time of chloride addition is such as to accomplish the desired chloride addition. Generally, a relatively short period of deposition is desired since the preferred goal is to deposit the chloride in the first portion of the catalyst bed without undue contact with water vapor. The treatment with the chlorine-containing gaseous stream often continues with respect to a given catalyst bed for a time of up to about 4 hours, preferably less than about 3 hours or even less than about 1 hour. By limiting this time and the amount of water present during chloride deposition, subsequent distribution of this component can be accomplished without unduly extended contact of the catalyst with the chlorine-containing gas stream at the elevated treating temperatures which can cause considerable damage to the catalyst, e.g. by a decrease in surface area.

Especially when the chloride addition to the catalyst bed is such as to deposit chloride primarily in the initial portion of the bed, the bed is further contacted with a gaseous stream composed predominantly of inert gas and containing oxygen. This contact is under conditions in the ranges which can be employed during the chloride deposition, and preferably without the addition of a chlorine-containing material to the treating gas, but with the requirement that a minor amount of water vapor be in the gas. It is believed that as a result of this further gas contact, distribution of the added chloride component through the major portion of the bed is accomplished. Thus, the temperature of the gas can be in the range of about 600 to 950° F., preferably about 800 to 950° F. when dispersion of the catalytic promoting metals is desirable. The total pressure can be generally about 50 to 500 p.s.i.g., preferably about 175 to 350 p.s.i.g., while the water vapor partial pressure preferably does not exceed about 0.8 p.s.i.a. The water vapor is often at least about 100 p.p.m. or even at least about 500 p.p.m. by volume of the gas stream The oxygen content of the gaseous stream can be such that the oxygen partial pressure is about 3 to 100 p.s.i.a., preferably about 5 to 50 p.s.i.a. The time period of the chloride distribution step is such as to give an adequate distribution of the chloride through the catalyst bed and it generally exceeds about 2 hours in length, and is preferably greater than about 4 hours in length. The length of time of the chloride distribution treatment conducted with chlorine not being added to the gas is preferably longer than the chloride deposition step.

The total amount of water vapor contacting the catalyst during the chloride deposition and distribution steps is preferably such that excessive chlorine is not lost from the catalyst bed in the gaseous effluent nor is there undue damages, if any, to the catalyst structure. The major portion of the chlorine should remain in the catalyst bed and preferably at least about 70 mol percent of this component should be retained by the bed. As previously noted, excessive chlorine loss can give rise to the corrosion of processing equipment and involves an unnecessary expense.

In terms of total water contact the chloride deposition and distribution steps are limited in time such that the total water vapor contact with the catalyst bed throughout both of these operations is not exessive. The amount of water vapor that can be tolerated without undue damage to the catalyst varies with the temperature of the treatment. For instance, it is preferred that at about 900° F. for both the chloride deposition and chloride distribution steps, the total amount of water vapor in the gas contacting the catalyst bed not exceed about 4 weight percent of the catalyst, while at about 700° F. it is preferred that this amount not exceed about 12 weight percent based on the catalyst.

The total amount of water vapor which contacts the catalyst during the chloride deposition and distribution steps of the method of this invention depends on the temperature of such treatments. The approximate preferred minimum amount of this total water vapor based on the weight of the catalyst is expressed by the relationship:

Weight percent total water vapor (WWV)
$$=0.62 \times 10^{-3} \times e^{\frac{9800}{T}}$$

while the approximate preferred maximum amount of this total water vapor based on the weight of the catalyst is defined as follows:

$$WWV = 2.67 \times 10^{-3} \times e^{\frac{9800}{T}}$$

T is the temperature of the treating gas in degrees Rankine.

During the chloride treatment of the method of the present invention a suitable chlorine source is introduced into the treating gas. Molecular chlorine or a variety of chlorine-containing compounds can serve as the source of chlorine as long as the compounds are essentially in the vapor state under the treating conditions. From a handling and measuring standpoint normally liquid, chlorine-containing agents are preferred, for instance, carbon tetrachloride. Other chlorine-containing compounds which can be employed in the method of this invention include methylchloride, trichloroethylene, ethylenedichloride, and other decomposable chlorine-containing compounds. Often where the chlorine-containing compound is organic it has from 1 to 3 carbon atoms.

The fixed catalyst beds treated in accordance with this invention are generally at least about one foot in depth in the direction of gas flow, frequently this depth will not exceed about 25 to 30 feet and more often is of the order of about 5 to 20 feet. The shorter flow depths are generally encountered in radial type reactors where the gas flow is from the periphery of the reactor to its central portion or vice versa.

The catalysts employed in the process of the present invention contain as previously noted, small catalytically-effective amounts of platinum group metal and rhenium promoters supported by an essentially alumina base and the catalyst which is disposed in a fixed bed is of macrosize. The platinum group metal and rhenium are each often about 0.05 to 3 weight percent of the catalyst, preferably about 0.1 or 0.2 to 1 weight percent. Platinum is the most preferred metal in such catalysts but other platinum group metals such as palladium and rhodium can be used. When the catalyst is in a virgin state the promoting metals preferably are for the most part undetectable by X-ray diffraction analysis, which indicates that if the metals be present in the catalyst as elemental metals or alloys their crystallite sizes are less than about 50 A. A common method of providing the platinum group metal in the catalyst is by contact of the support, either in hydrous or in calcined form, with an aqueous solution of a chlorine-containing compound, for instance chloroplatinic acid. In this manner chlorine is incorporated in the catalyst for instance, in amounts of about 0.2 to 2 weight percent, preferably about 0.3 to 1 weight percent. The chlorine component can also be added to the catalyst from a source other than the compound supplying the platinum group metal. Rhenium can also be added to the hydrous or calcined support through contact with an aqueous solution of a rhenium compound, e.g. perrhenic acid or ammonium perrhenate. If promoting metal is added to a calcined support the resulting composite is generally recalcined.

The alumina support in the catalyst of the present invention often has a surface area of at least about 150 square meters per gram and is preferably composed to a major extent of gamma-family alumina modifications derived by the activation or calcination of alumina trihydrates. These gamma-family alumina modifications include among others, gamma and eta aluminas. U.S. Pat. No. 2,838,444 discloses this type of alumina support having surface areas in the range of about 350 to 550 square meters per gram, while in U.S. Pat. No. 2,838,445 there is described catalyst supports made from predominantly trihydrate alumina precursors, the supports having surface areas in the range of at least about 150 square meters per gram. These supports are suitable for use in the present invention, especially the higher area supports of Pat. 2,838,444. As stated, the preferred alumina precursors predominate in trihydrates which may contain one or more of the bayerite, gibbsite or nordstrandite (previously called randomite) forms and preferably a major amount of trihydrate is composed of bayerite or nordstrandite which when calcined can form eta alumina. It is also advantageous that the hydrous alumina precursor contain about 65 to 95% of the trihydrate with the essential balance being composed of one or both of the alumina monohydrate, boehmite, or amorphous hydrous alumina. Preferred supports have pore volumes of at least about 0.1 cc./gm., preferably at least about 0.15 cc./gm., in pores greater than about 100 A. in radius. It is also preferred that the supports have at least about 0.05 cc./gm. in pores greater than about 300 A. or even greater than about 600 A. in radius. These determinations are by the method described by Barrett, Joyner and Halenda, JACS, 73, p. 373 (1951).

The gamma-family alumina modifications which can be referred to as activated forms of alumina result from the calcination, preferably in an oxygen-containing gas, of a hydrous alumina precursor. Calcination of the catalysts used in this invention can be conveniently conducted at temperatures of the order of about 700 to 1200° F. or more and this operation can be controlled to give a final catalyst of desired surface area. At an appropriate stage in the manufacture of the catalyst, the particles can be formed into macrosize as distinguished from finely divided or fluidized catalyst types. The macrosize particles frequently have diameters in the range of about 1/64 to 3/8 inch, preferably about 1/16 to 1/4 inch, and if not spherical, the particles usually have lengths of about 1/64 to 1 inch or more, preferably about 1/8 to 1/2 inch.

The catalysts treated in accordance with the process of this invention can be employed in a variety of hydrocarbon conversions conducted at elevated temperatures and under a reducing atmosphere which is usually provided by the presence of a molecular hydrogen-containing gas. Before use, or reuse after regeneration and reactivation, the catalyst can be reduced by contact with a molecular hydrogen-containing gas at elevated temperatures. The catalysts whose reactivation is of primary concern in this invention are those that have been deactivated through the deposition thereon of carbon and loss of chlorine, and possibly through promoting metal crystallite growth while being employed in the reforming of gasoline boiling range hydrocarbons whether they boil in a broad or narrow temperature range. In such operations naphtha, a fraction thereof or other similar boiling range hydrocarbons whose aliphatic constituents are for the most part saturated and which may contain some aromatics, is converted to a product having greater aromaticity and higher octane rating. Relatively pure aromatics can be separated from the products or if the feed is of sufficiently narrow boiling range, a relatively pure aromatic may be the predominently normally liquid product from the operation. Advantageously, the hydrocarbon feed and hydrogen gas passing to a given reactor in the reforming system contain less than about 10 p.p.m. by weight sulfur, and preferably less than about 5 p.p.m. by weight combined nitrogen and less than about 30 p.p.m. by weight water. Superior operation can be effected when the hydrocarbon feed and hydrogen gas contain less than about 5 p.p.m. sulfur, and preferably less than about 10 p.p.m. water and less than about 2 p.p.m. combined nitrogen. The naphtha reforming systems are usually conducted at processing conditions which include reactor inlet temperatures of about 800 to 1000° F. and total pressures of about 100 to 600 p.s.i.g., preferably about 150 to 350 p.s.i.g. During the operation hydrogen-containing effluent gas is recycled to the reaction system, the latter normally having a series of adiabatic fixed bed catalyst reactors preceded by feed heaters. The recycle gas ratio is usually such to provide about 3 to 30 moles of gas per mole of hydrocarbon feedstock. Also, the hydrocarbon charge is often passed to the reactor system at a rate such that the overall space velocity is about 0.5 to WHSV (weight of hydrocarbon per weight of catalyst per hour), preferably about 1 to 10 WHSV.

In many naphtha reforming units in commercial operation at the present time the hydrocarbon feed has a clear or unleaded research octane rating (RON) in the range of about 30 to 75, and the severity of the reaction conditions are such that the normally liquid reformate or product has a RON of at least about 90 or even at least about 95 or 100. In such operations, the reactor inlet temperatures are often in the range of about 800 to 975° F., preferably at least about 825° F., while the total pressure of the system is about 100 to 350 p.s.i.g. In this relatively severe reaction system reactivation of the catalyst by chlorine addition in accordance with the present invention is of particular advantage.

During use of the catalyst treated in this invention to promote the conversion of hydrocarbons at elevated temperatures, a carbonaceous deposit forms on the catalyst. When the operation is stopped for regeneration by burning of the carbonaceous deposit, the carbon content of the catalyst is generally above about 0.5 weight percent, often greater than about 10 weight percent. Also during the hydrocarbon conversion process there occurs a loss of chlorine from the catalyst. As these effects continue the catalyst loses activity which can be counteracted by increasing the reaction temperature. Eventually however, when the temperature reaches a desired maximum, which in the case of naphtha reforming systems is usually in the range of about 950 to 1000° F., especially at about 970° F. and above, it becomes inadvisable to increase the temperature further, otherwise undue aging of the catalyst may result. The catalyst can then be regenerated by carbon burn-off which usually improves catalytic activity and perhaps even sufficiently to warrant reuse of the catalyst without reactivation, for instance by chlorine addition.

In any event in the process-regeneration scheme, whether conducted for one cycle or for two or more cycles, it becomes desirable to increase the chlorine content of the catalyst and in some cases to decrease the size of the promoting metal crystallites of the catalyst. At this point following the removal of carbon from the catalyst, the method of the present invention can be employed. During regeneration of the catalyst by burning, the carbon level is often reduced to below about 0.5 weight percent, preferably below about 0.2 weight percent. This burning is conducted through contact of the catalyst with an oxygen-containing gas and generally the amount of oxygen is controlled to maintain the temperature of the catalyst from about 700°F. to about 900 or 1000° F., preferably within the temperature range of about 700 to 850° F. The pressure maintained during burning is preferably elevated, for instance is about 50 to 500 p.s.i.g. The controlled burning is usually initiated with an inert gas containing a small amount of oxygen, for instance, up to about 1 mole percent and preferably with an oxygen partial pressure of at least about 0.2 p.s.i.a. When the bulk of the carbon has been removed from the catalyst by a gas containing the relatively low concentration of oxygen, the amount of oxygen can be increased somewhat to insure that sufficient carbon has been removed from the catalyst without exceeding the desired temperatures. This type of treatment is exemplified by one or more burns-through of the catalyst bed at about 800° F. to 850° F. and about 50 to 500 p.s.i.g., with a gas containing above about 1 to about 3 or somewhat greater mole percent oxygen. Other suitable carbon-burning procedures can be employed as long as the temperatures are controlled and the carbon level of the catalyst is adequately lowered. During carbon burn-off and subsequent treatments of the catalyst with an oxygen-containing or other gas at elevated temperature, the gas should be dry enough to avoid undue additional sintering of the catalyst and loss of surface area. Such loss generally increases as temperature, water content of the gas or treating time is raised.

Especially where the crystallite size of the promoting metals on the catalyst is to be reduced, the catalyst can, after carbon burn-off or even after chloride reactivation, be contacted with an oxygen-containing gas at a temperature of about 800 to 1000° F., preferably about 850 to 950° F., and, if desired, an elevated pressure such as about 100 to 500 p.s.i.g. This treatment has been referred to in the art as an air soak and the oxygen content of the gas is usually greater than that present in the gas employed for carbon burn-off. Thus, the oxygen content of the gaseous stream employed for air soaking is often at least about 5 mole percent with there having been found no particular reason for increasing the gas content above about 20 mole percent. This air soaking period is generally at least about one hour and is usually continued for several hours, for instance, in the range of about 5 to 24 hours. Regeneration and air soaking procedures suitable for the catalyst of the present invention are disclosed in U.S. Pat. No. 2,922,766, herein incorporated by reference.

The regenerated and reactivated catalysts of this invention can cause undue cracking when initially used in a naphtha reforming or other hydrocarbon processing cycle. To avoid this undesirable result the catalyst of the present invention can be contacted with a gas containing a sulfur-providing component in vaporous form. Suitable sulfur-providing materials or sulfiding agents include $SO_2$ and $H_2S$, preferably the latter. The amount of sulfiding agent employed is at least about 25% or even at least about 50% of the stoichiometric amount needed to give one atomic weight of sulfur for each atomic weight of total platinum group metal and rhenium in the catalyst, preferably the amount is at least about 50%, say up to about 500% or more. The sulfiding operation can be done at an elevated temperature, e.g. about 650 to 950° F., and at any suitable pressure, preferably an elevated pressure such as about 100 to 500 p.s.i.g. The sulfiding gas is reductive and usually contains a minor amount of the sulfur-bearing component, e.g. about 0.1–10 volume percent, preferably about 0.2 to 2%, with the major component being hydrogen or an inert gas such as nitrogen. Also the sulfiding agent can be added to the inlet of each reactor of the hydrocarbon processing system to minimize contact with other equipment surfaces when corrosion might occur. Sulfiding can be conducted simultaneously with or subsequent to reducing the catalyst with hydrogen or gases containing hydrogen and other materials such as low molecular weight hydrocarbons as in reformer recycle gas. It is preferred that sulfiding be conducted before or at least simultaneously with the first significant contact of the regenerated and chloride-reactivated catalyst with hydrocarbon, for instance, that present in reformer recycle gas. It is desirable in any event that the sulfiding be prior to contact of the regenerated and chloride-reactivated catalyst with the hydrocarbon feedstock to be processed.

It can be further advantageous in minimizing hydrocracking caused by the freshly regenerated and chloride reactivated platinum group metal-rhenium-alumina catalysts, to supply vaporous sulfiding agent to the conversion system when charging of the hydrocarbon feedstock is begun. Thus, a small amount of the sulfiding agent, sufficient to significantly reduce hydrocracking during the initial portion of the processing cycle, can be charged with the recycle gas or with the hydrocarbon stream. The amounts of sulfiding agent employed include about 1 to 500 p.p.m. by volume based on the hydrogen passing to the reaction system, preferably about 5 to 200 p.p.m. This sulfiding agent addition can be continued as long as the operator desires but often the addition will approximate the time period in which, in the absence of the sulfiding-agent addition, the catalyst would cause significantly excessive hydrocracking. Hydrocracking can be detected in the processing system by any desirable means such as a drop in the hydrogen content of the off-gases, or the temperature rise in the catalyst bed. The period of sulfiding-agent addition upon placing the regenerated and chloride-reactivated catalyst back on processing can include for instance, 1 to 20 or 60 days or more and is often about 1 to 10 days.

The present invention is illustrated by the following example.

The catalyst is a 1/16" extrudate having an alumina base of the type disclosed and claimed in U.S. Pat. 2,838,444. The virgin catalyst contains about 0.6 weight percent platinum and about 0.6 weight percent rhenium on alumina derived from a hydrous alumina mixture having about 75% trihydrate which is predominantly bayerite and nordstrandite, the essential balance being boehmite and amorphous hydrous alumina. The catalyst in the calcined, virgin state has a surface area of about 400 to 550 square meters per gram and a chloride content of about 0.7 weight percent derived from the use of chloroplatinic acid as the source of platinum.

The catalyst is used in the reforming of petroleum naphtha in a system having a plurality of adiabatic fixed catalyst bed reactors, each preceded by a feed heating means. The naphtha typically analyzes by volume approximately 47% paraffins, 40% napthenes, and 13% aromatics and the $C_5$ to end point gasoline product has an octane rating of about 90 to 91 (RON). Reforming is conducted at the approximate processing conditions of 920 to 960° F. feed inlet temperatures for the reactors whose catalyst is later reactivated, 300 p.s.i.g. total pressure, recycle gas to naphtha mole ratio of 5/1 and 2.5 overall WHSV space velocity. After several months of operation the used and regenerated catalyst has a surface area of 160 m.²/gm. and analyses of 0.14% Cl and its activity is considerably lower than that of the virgin catalyst.

The catalyst after purging with nitrogen is regenerated and reactivated according to the method of the present invention. Regeneration is by carbon burn-off at a total pressure of about 300 p.s.i.g., initially using a gas containing about 0.6 mol percent oxygen while maintaining the maximum catalyst temperature at about 850° F. Further burning of the catalyst is conducted with gas of increased oxygen content while keeping the temperature below about 850° F. and the final gas contains about 2 mol percent oxygen.

The catalyst beds in three reactors in the system are then reactivated by the addition of chloride. The chlorine-containing material is deposited first in the catalyst bed of the last of the three reactors, then in the bed of the intermediate of the three reactors, and finally in the bed of the first of the three reactors. The first and second of the three reactors have gas flow paths through their respective catalyst beds of about 5 feet, while the path of gas flow through the catalyst bed of the last of the three reactors is about 12 feet. Reactivation is started in the last of the three reactors by adding about 900 parts per million by weight (p.p.m.) carbon tetrachloride to a recirculating gas passing through all reactors at about 700° F., and 350 p.s.i.g., and containing about 6 mol percent oxygen and 1300 p.p.m. water vapor. This treatment is continued for about 5 hours after which the chloride addition to the last reactor is stopped.

The carbon tetrachloride is then added in the same amount to the gas stream passing into the inlet of the second of the three reactors for about one hour and then stopped, followed by addition of carbon tetrachloride in the same amount to the gas stream passing into the inlet of the first of the three reactors for about 0.5 hour, and then stopped. During the chloride addition the oxygen content of the circulating gas stream is about 5 to 6 mol. percent, and the water vapor content of the gas is about 1500 to 1600 p.p.m. The temperature of the treating gas is about 700° F. throughout the chloride addition and sufficient carbon tetrachloride is added to raise the chlorine (Cl) content of the total catalyst in the three reactors by about 0.4 weight percent. After all of the carbon tetrachloride is added, circulation of the gas is continued through the three reactors for about seven hours which continues to distribute chloride through the catalyst beds and the temperature of the gas stream is allowed to cool to about 400° F. during this period.

After purging with nitrogen the catalyst is contacted with hydrogen at 600° F. and 200 p.s.i.g. for 18 hours and then reduced in hydrogen for 2 hours at 900° F. During carbon burn-off and reduction of the catalyst the gases passing to the initial catalyst bed contain less than 10 p.p.m. $H_2O$ due to passage of the gas through a drier containing a crystalline aluminosilicate absorbent having pores of 4 A. size. The catalyst is then contacted with hydrogen containing 1 volume percent $H_2S$ and at 850° F. and 200 p.s.i.g. By continuing this $H_2$-$H_2S$ gas contact for about 0.5 hour the catalyst is sulfided and any tendency of the catalyst to cause undue hydrocracking and excessive gasoline yield loss is markedly diminished.

Subsequent use of the resulting catalyst in reforming naphtha under essentially the same conditions as employed in the period prior to regeneration (except that for the first ten days of reforming operation the recycle gas is provided with about 20 p.p.m. $H_2S$) shows that the $C_5$ to end point yield is close to expected virgin catalyst performance, and even after 3 months of operation this yield is only slightly below expected virgin catalyst performance.

It is claimed:

1. A method for reactivating a fixed bed of platinum group metal and rhenium promoted alumina catalyst of macrosize which has been deactivated by use in conversion of hydrocarbons at elevated temperature in the presence of molecular hydrogen, said catalyst having deposited thereon a carbonaceous material, the alumina of said catalyst being derived by calcination of hydrous alumina precursor, which consists essentially of regenerating said catalyst by burning carbonaceous deposit from said catalyst through contact with an oxygen-containing gas, adding and depositing chloride in the initial portion of the catalyst bed by contacting regenerated catalyst having a chloride content of about 0.05 to 0.8% with a gaseous stream consisting essentially of inert gas, oxygen and vaporous chlorine-containing agent which supplies and deposits chloride in the initial portion of the catalyst bed, said gaseous stream containing a mole ratio of water vapor to chloride of 0 to about 10:1, said contacting for chloride addition being at a temperature of about 600 to 950° F., an oxygen partial pressure of about 3 to 100 p.s.i.a. and a water vapor partial pressure of zero to about 0.8 p.s.i.a. and said contacting for chloride addition continuing until at least about 0.2% chlorine has been added to the catalyst based on the total weight of catalyst in said bed, and subsequently distributing chloride through a major portion of said bed until the catalyst bed has about 0.4 to 1% chloride based on the total weight of catalyst in said bed by contacting said catalyst with a gaseous stream consisting essentially of inert gas, oxygen and at least about 100 p.p.m. of water vapor and in the absence of addition of chlorine-containing agent to the gaseous stream, whereby such distributing with said gaseous stream produces a loss of chloride of not more than about 30 mole percent, said subsequent contacting being at a temperature of about 600 to 950° F., an oxygen partial pressure of about 3 to 100 p.s.i.a., and a water vapor partial pressure of up to about 0.8 p.s.i.a., with the proviso that the amount of water vapor in the gaseous stream throughout said contactings is such that during the total time of said contactings the total amount of water vapor contacting the catalyst is up to a maximum of approximately $$2.67 \times 10^{-3} \times e^{\frac{9800}{T}}$$

T being the temperature of the treating gas in degrees Rankine.

2. The method of claim 1 in which the platinum group is platinum.

3. The method of claim 2 in which the alumina of said catalyst is derived by calcination of a hydrous alumina precursor containing a major amount of alumina trihydrate.

4. The method of claim 1 wherein the temperatures of said contactings are about 800 to 950° F.

5. The method of claim 1 in which the gaseous stream containing the chlorine-containing agent has a water to chlorine mole ratio of at least about 1:1 and the water vapor content of the gaseous stream is at least about 100 p.p.m. by volume.

6. The method of claim 1 wherein the catalyst is deactivated by use in reforming gasoline boiling range hydrocarbons at a reactor inlet temperature of about 875 to 975° F. and the product has an octane rating of at least about 90 research octane numbers.

7. The method of claim 6 in which the platinum group metal is platinum.

8. The method of claim 7 in which the catalyst contacted with the chlorine-containing agent has a surface area of about 150 to 250 square meters per gram and after the contact with the gaseous streams contains about 0.4 to 1 weight percent chloride.

9. The method of claim 8 in which the chlorine-containing agent is carbon tetrachloride.

10. The method of claim 9 wherein the temperature of said contactings are about 800 to 950° F.

11. The method of claim 1 in which the regenerated and chlorine-treated catalyst is reduced, sulfided and reused in the conversion of hydrocarbons at elevated temperature in the presence of molecular hydrogen.

12. The method of claim 11 in which the platinum group metal is platinum.

13. The method of claim 6 in which the regenerated and chlorine-treated catalyst is reduced, sulfided and reused in the conversion of hydrocarbons at elevated temperature in the presence of molecular hydrogen.

14. The method of claim 2 in which the regenerated and chlorine-treated catalyst is reduced, sulfided and reused in the conversion of hydrocarbons at elevated temperature in the presence of molecular hydrogen.

15. The method of claim 14 in which the catalyst contacted with the chlorine-containing agent has a surface area of about 150 to 250 square meters per gram and after the contact with the gaseous streams contains about 0.4 to 1 weight percent chloride.

16. The method of claim 15 in which the alumina of said catalyst is derived by calcination of a hydrous alumina precursor containing a major amount of alumina trihydrate, and the amount of water vapor in the gaseous stream throughout said contactings is such that during the total time of said contactings the total amount of water vapor contacting the catalyst is about $$0.62 \times 10^{-3} \times e^{\frac{9800}{T}}$$

to about $$2.67 \times 10^{-3} \times e^{\frac{9800}{T}}$$

T being the temperature of the treating gas in degrees Rankine.

17. The method of claim 16 in the platinum group metal is platinum.

18. The method of claim 17 in which a vaporous sulfiding agent is present with the hydrocarbon feed contacting the catalyst to reduce hydrocracking when the catalyst is reused.

19. The method of claim 18 in which the vaporous sulfiding agent is $H_2S$ and is about 1 to 500 p.p.m. based on the hydrogen passing to the reforming system.

References Cited

UNITED STATES PATENTS

| | | | |
|---|---|---|---|
| 3,496,096 | 2/1970 | Kluksdahl | 252—419 |
| 3,415,737 | 12/1968 | Kluksdahl | 208—139 |
| 3,247,128 | 4/1966 | White et al. | 252—415 |
| 3,407,135 | 10/1968 | Brown | 252—415 |
| 3,243,384 | 3/1966 | Raaruv, Jr. | 252—415 |
| 3,117,076 | 1/1964 | Brennan et al. | 208—140 |
| 2,916,440 | 12/1959 | Hogin et al. | 208—140 |
| 3,637,524 | 1/1972 | Johnson et al. | 252—415 |
| 3,578,582 | 5/1971 | Jacobson | 208—140 |

DANIEL E. WYMAN, Primary Examiner

P. E. KONOPKA, Assistant Examiner

U.S. Cl. X.R.

208—140; 252—419

UNITED STATES PATENT OFFICE
CERTIFICATE OF CORRECTION

Patent No. 3,781,219    Dated December 25, 1973

Inventor(s) Marvin F. L. Johnson and Stuart L. Graff

It is certified that error appears in the above-identified patent and that said Letters Patent are hereby corrected as shown below:

Column 11, claim 6, after 975°F. should be added "and a total pressure of about 100 to 350 pounds".

Signed and sealed this 29th day of October 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

PATENT NO. : 3,781,219

DATED : December 25, 1973

INVENTOR(S) : Marvin F. L. Johnson and Stuart L. Graff

It is certified that error appears in the above-identified patent and that said Letters Patent are hereby corrected as shown below:

-- Claims priority, application Canada, June 20, 1969, 054,906 -- should appear at line 8, column 1, of the above-identified patent.

Signed and Sealed this

Twenty-seventh Day of July 1976

[SEAL]

Attest:

RUTH C. MASON
*Attesting Officer*

C. MARSHALL DANN
*Commissioner of Patents and Tradema*